Sept. 10, 1968 D. M. ANDRUS ET AL 3,401,344

HORIZONTAL SWEEP GENERATOR INCLUDING A CAPACITIVE RESET MILLER INTEGRATOR

Filed Jan. 5, 1966 2 Sheets-Sheet 1

INVENTOR.
DONALD M. ANDRUS AND
JOHN W. GRAY

BY H. S. Mackey

ATTORNEY

HORIZONTAL SWEEP GENERATOR INCLUDING A CAPACITIVE RESET MILLER INTEGRATOR

Filed Jan. 5, 1966 2 Sheets-Sheet 2

INVENTOR.
DONALD M. ANDRUS AND
JOHN W. GRAY

BY H. S. Mackey
ATTORNEY

United States Patent Office 3,401,344

Patented Sept. 10, 1968

3,401,344
HORIZONTAL SWEEP GENERATOR INCLUDING A CAPACITIVE RESET MILLER INTEGRATOR

Donald M. Andrus, Lincolndale, and John W. Gray, Pleasantville, N.Y., assignors to General Precision Systems, Inc., a corporation of Delaware Filed Jan. 5, 1966, Ser. No. 518,837
4 Claims. (Cl. 328—128)

ABSTRACT OF THE DISCLOSURE

A Miller integrator whose output is connected to a monostable multivibrator is provided with a capacitive reset input which in turn is operated by a switching circuit controlled by the pulse output of the monostable multivibrator. During the interpulse period the switching circuit operates to connect one side of a capacitor to a potential input source while at the same time connecting the other side of the capacitor to ground. During the pulse period of the monostable multivibrator the switch circuit is opearted to connect the one side of the capacitor to ground and the other side of the capacitor to the input of the Miller integrator amplifier thus applying a potential which opposes that of the potential input source.

The present invention relates to horizontal sweep generators such as may be used in a television system. In particular, the present invention is an improved horizontal sweep generator from which an internal keying pulse is available for controlling generation of other signals which also may be used in a television system. The improved horizontal sweep generator provides the usual sawtooth sweep signal and controls generation of other signals such as a horizontal drive signal, a horizontal sync signal, a horizontal unblanking signal and a horizontal blanking signal. These latter signals are all related to the sawtooth sweep signal in time and frequency.

From one aspect the present invention is an improved horizontal sweep generator employing a novel combination of components, for providing a linear, frequency stable sawtooth sweep signal. This novel combination includes an internal keying circuit which has an output which serves to maintain frequency stability of the sweep signal and also may serve as a keying pulse to maintain an absolute relationship with respect to timing and frequency of additional signals normally used cooperatively to drive a television system. This essentially provides a plurality of different signals for use in a television system with all the signals synchronized with a common keying signal.

The improved horizontal sweep generator is characterized by being adjustable in frequency from at least, for example, 15,000 cycles per second (15K c.p.s.) to at least 25,000 cycles per second (25 K c.p.s.) with frequency stability better than $\pm 0.1\%$. This means that since the other signals are coordinated and synchronized with the internal keying circuit of the horizontal sweep generator then the other signals are also adjustable in frequency to the same extent as the horizontal sweep generator.

From another aspect the present invention is an improved horizontal sweep generator employing a Miller integrator triggering a monostable multivibrator with capacitive reset of the integrator controlled by the multivibrator. This provides a loop control whereby the output of the integrator is essentially controlling the input into the integrator. The sawtooth waveform of the horizontal sweep generator is a product of the Miller integrator output which rises linearly. The integrator is reset so that its output falls linearly thus providing the sawtooth form wave.

It is an object of the present invention to provide an improved horizontal sweep generator.

Another object is to provide a sawtooth wave generator through using a Miller integrator with feedback control of the input by the output.

Another object is to provide a horizontal sweep generator which includes a loop controlled capacitive reset for providing a sawtooth wave output.

These and other objects will become apparent from reading the following detailed description with reference to the accompanying drawings in which.

Figure 1:
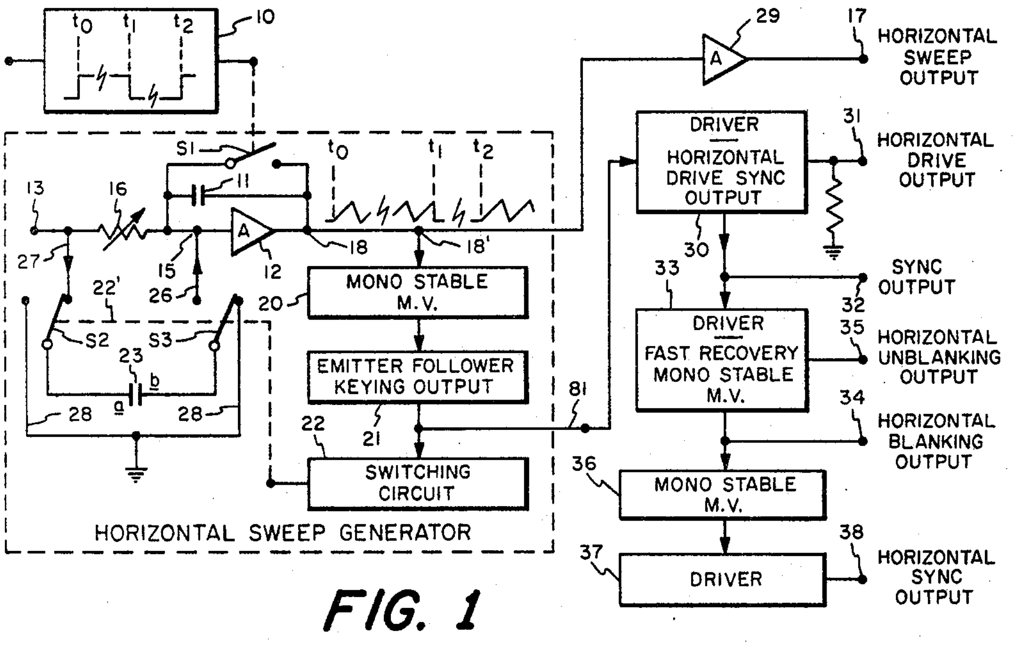
FIG. 1 is a block diagram of the present invention.

Referring to FIG. 1, block 10 represents a vertical field rate gating circuit which operates or controls the switch S1. The switch S1 is shown as a mechanical switch although such switch may be in electronic form, for example, a transistor. When switch S1 is closed the capacitor 11 is shunted and the integrator 12 is shunted between its input and output, thus the output of the integrator drops to essentially zero. When switch S1 is open the capacitor 11 supplies a Miller effect to the integrator so that the capacitor 11 combines with the amplifier 12 to provide a Miller integrator. This component is well known to those skilled in the art.

Figure 3:
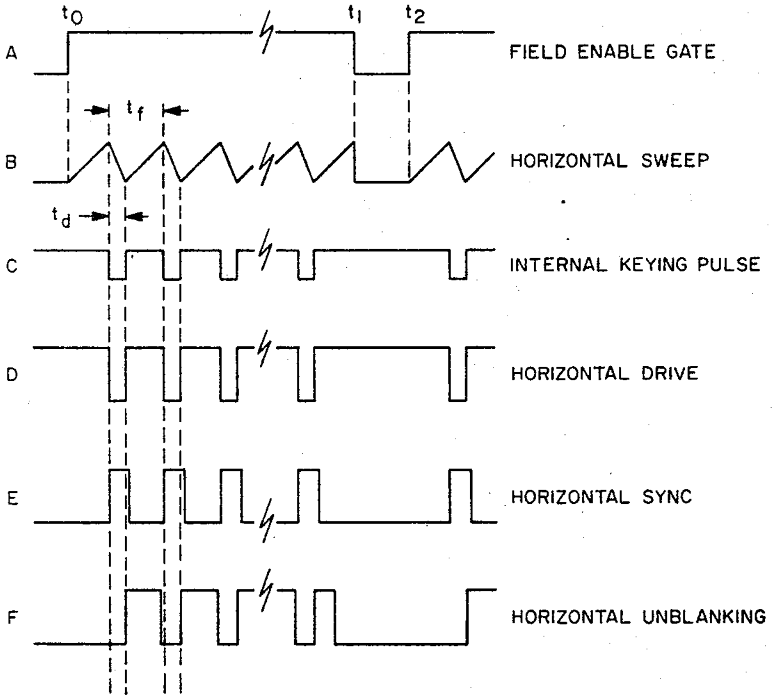
FIG. 3 is a diagram of waveforms helpful in understanding the invention.

FIG. 3 shows at A the Field Enable Gate wave. During the time $t_0$ to $t_1$ the character of the output of the gating circuit 10 is such as to cause switch S1 to be open. During the time $t_1$ to $t_2$ the output of the gating circuit 10 causes switch S1 to close thus shunting capacitor 11 and the input to output of the integrator 12.

Terminal 13 represents the input terminal of the horizontal sweep generator circuit. In its preferred form, a voltage of some −10 volts direct current (DC) regulated supply is applied to terminal 13. Adjustable resistor 16 is provided in the input circuit and functions as an output frequency control. With the input voltage substantially constant at −10 volts DC, for example, the frequency of the sawtooth output at 17, which is the amplified signal of the output at junction 18 (and 18') may be varied from, for example, 15 kc. to 25 kc. with great frequency stability by varying the resistance in the variable resistor 16, according to the extreme values of the resistor 16.

Another method of varying the frequency of the sawtooth wave output is by varying the amplitude of the input at 13. An input of increased amplitude will increase the frequency of the output, for example.

The sawtooth wave output of the Miller integrator at 18' is applied to a monostable multivibrator 20. The multivibrator represented by block 20 in FIG. 1 is shown in its preferred circuit form in FIG. 2. Essentially the monostable multivibrator is a voltage level responsive circuit which triggers when the sawtooth wave reaches an amplitude of predetermined value. In normal operation this occurs on the upward excursion of the sawtooth wave. The trigger value of the monostable multivibrator 20 is set by the component values of the multivibrator circuit.

The output of the multivibrator is applied to a keying circuit which may be in the form of an emitter follower, represented by block 21.

The output of the emitter follower is here referred to as a Keying Output or Internal Keying Pulse (seen at C in FIG. 3). The keying output is applied to a switching circuit 22 which is part of the horizontal sweep generator. The keying output is also applied to circuits which are external to the horizontal sweep generator. Block 30 represents a driver which provides a horizontal drive sync output represented at 31 and a sync output represented at 32.

The switching circuit 22 controls the switches S2 and S3, as indicated by broken line 22', which are alternately switched to ground, thereby grounding first one side and then the other of a capacitor 23.

As illustrated, the capacitor 23 is connected between the input 13 and ground. This connection charges capacitor 23 substantially to the value of the input voltage, here considered −10 volts. Thus side *a* of capacitor 23 will be at substantially −10 volts (when fully charged) and the side *b* of capacitor 23 will be at ground. If the switches S2 and S3 are then reversed the side *a* becomes essentially ground and the side *b* effectively becomes +10 volts. The charge is applied to the input of the integrator which acts to oppose the −10 volt input at 13 through resistor 16. This has the effect of dropping the output voltage of the integrator to a reset level, the actual level depending upon the relative value of the circuit components.

The purpose of the functions above described is to provide the sawtooth output which constitutes the output of the horizontal sweep generator. In addition, the sawtooth wave output is selfcontrolled since the amplitude of each slope of the wave triggers the multivibrator, at a predetermined amplitude, which operates to provide a keying output which essentially controls switching of a reset capacitor so that a charge of opposite polarity is applied to the input of the integrator so that the output of the integrator will drop to its starting point in that same time. This action provides the sawtooth wave output.

Obviously an amplifier, such as represented by 29, may be employed to amplify the sawtooth of 18 into the Horizontal sweep output at junction 17 to a desired amplitude.

When the gating circuit 10 functions to effect closure of switch S1 the output of the Miller integrator 12/11 drops to a reference or ground level, here assumed to be the starting level.

The horizontal sweep output sawtooth wave is illustrated at B. Time $t_f$, which represents the frequency of the sawtooth waveform may be adjusted by changing the resistace value of variable or adjustable resistor 16 while the input voltage is held constant.

Functionally, when the increasing slope of the sawtooth wave reaches a predetermined value, the multivibrator triggers. When the multivibrator is triggered, the internal keying pulse (wave C) occurs in response thereto. Thus the leading edge of the internal keying pulse is substantially in coincidence with the apex of the sawtooth waveform of the wave B. The keying pulse functions to operate the switching circuit which switches the capacitor leads by reversing the switches S2 and S3. Obviously electronic switches may be employed although mechanical switches are shown. The length of the keying pulse is a function of the recovery time of the monostable multivibrator 20. The decreasing amplitude slope of the normal sawtooth wave structure is a function of the discharge time of capacitor 23.

Thus the interrelation of the sawtooth sweep output controlling itself may be easily seen.

The outputs for the horizontal drive 31, sync 32, blanking 34 and unblanking 35 functions are essentially initiated by the internal keying pulse.

The Driver, represented by block 30, providing the horizontal drive output at 31 and sync output at 32 may be any conventional driver. The Fast Recovery Monostable Multivibrator and Driver combination, reprsented by block 33 for providing the horizontal blanking and horizontal unblanking outputs at 34 and 35 respectively may also be of conventional or well known circuitry.

The Monostable Multivibrator represented by block 36 and the Driver represented by block 37, which combine their functions for providing the horizontal sync output, 38, may be of the conventional or other well known circuits.

Figure 2:
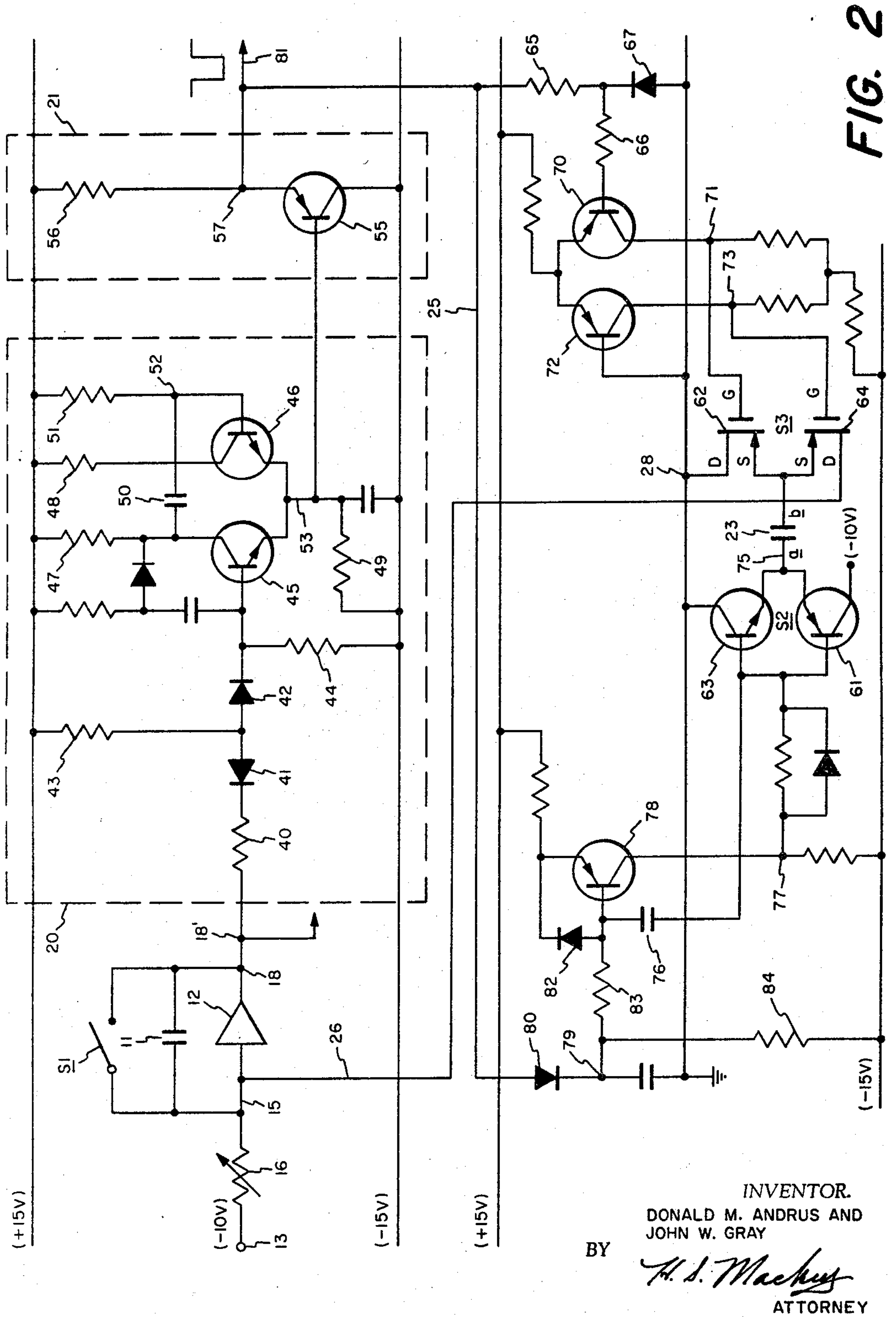
FIG. 2 is a diagram partly in block and partly in schematic form of the horizontal sweep generator.

Referring to FIG. 2, the horizontal sweep generator is shown in its preferred form with certain of the components in block diagram form and other components in schematic diagram form.

In the upper left of the drawing the input 13 and the frequency adjusting resistor 16 are shown. The switch S1 is shown as a mechanical switch although an electronic equivalent may be used. Also shown is the Miller integrator with its output at 18 and 18'.

The output at 18 and/or 18' is represented in FIG. 3 at B, the wave being a sawtooth or sweep waveform. When the switch S1 is open, as illustrated the amplitude of the potential at junction 18' rises and falls in the manner represented by the wave B in FIG. 3. The wave B may rise from a reference voltage, such as zero to some 1.6 volts, for example. At 1.5 volts, for example the diode 41 may become blocked and thereby open a second current path for the current flowing through resistor 43. For example, when the potential at junction 18' is below 1.5 volts (on the increasing excursion of the wave B) diode 41 is unblocked and the current path of the +15 volts (B+) supply follows through resistor 43, diode 41, resistor 40 junction 18' to the amplifier output and to a common return through the amplifier. With the path described the potential applied to the base of transistor 45 is low, relative to the B+ supply. When the potential at junction 18' reaches 1.5 volts, for example, diode 41 becomes blocked and the B+ current path becomes resistor 43, diode 42 and resistor 44 to the −15 volt supply (B−). This alternate current path affects the potential applied to the base of transistor 45 sufficiently to drive transistor 45 to conduction (normally transistor 45 is not conducting and transistor 46 is conducting).

As transistor 45 begins to conduct its collector goes less positive. This potential passes through capacitor 50 and is applied to the base of transistor 46 via junction 52 thereby driving transistor 46 to cut off. It should be noted that the resistance of resistor 48 in the collector circuit of 46 is relatively low, the resistance of resistor 47 in the collector circuit of 45 is relatively high and resistor 49 is common to the emitter circuits of both transistors.

Therefore, when transistor 46 is conducting the potential at junction 53 is relatively high and when transistor 45 is conducting the potential at junction 53 becomes relatively low.

Thus, the output taken from the emitter circuit of the transistors 45 and 46, when the multivibrator circuit triggers, is a negative-going pulse.

The negative-going pulse, via junction 53, is applied to an emitter-follower, transistor 55 and resistor 56 which may be the keying output circuit represented by block 21 in FIG. 1.

Reset of the multivibrator is timed by the RC combination of resistor 51 and capacitor 50. When capacitor 50 becomes charged sufficiently so that the potential applied to the base of transistor 46 is sufficiently high, transistor 46 again conducts. By the time transistor 46 conducts the wave at 18' has dropped off, see FIG. 3, B and diode 41 becomes unblocked. With diode 41 unblocked the current path including resistor 43, diode 41 and resistor 40 and through part of the circuit of the amplifier 12 is electrically completed and the base of transistor 45 drops to a potential sufficiently low to cut off transistor 45.

The ouput of the emitter-follower (broken line block 21 in FIG. 2) at junction 57 follows the potential at junction 53, thus the keying pulse (FIG. 3, C) is a negative-going pulse having substantially square characteristics.

The remainder of the circuit shown in FIG. 2 includes the switching circuit and the reset capacitor represented by capacitor 23.

The electronic equivalent of the switches S2 and S3 are the transistors 61 and 63 (S2) and 62 and 64 (S3). In the preferred arrangement the transistors 62 and 64 are MOS field effect transistors.

When the sweep wave or output at 18 is increasing (on the linear rise of the sawtooth wave), the multivibrator is in its normal or quiescent state. Transistor 46 is conducting and transistor 45 is nonconducting. In this condition junction 53 is at relatively high (positive) potential because of the values of resistors 48 and 49. The output of the emitter-follower at junction 57 follows the potential at junction 53. The potential at junction 57 is applied via lead 25 and resistor 65 to the base of transistor 70 which is of the PNP type. Thus transistor 70 is held normally nonconducting. With transistor 70 nonconducting, transistor 72 is conducting. In this condition junction 71 is at relatively low potential and junction 73 is at relatively high potential. The potential at junction 71 is applied to the gate G of field effect transistor 62 while the potential at junction 73 is applied to the gate G of field effect transistor 64. With a relatively low potential at 71 transistor 62 is conducting thus electrically connecting the plate *b* of capacitor 23 to ground via lead 28. With a relatively high potential at 73 transistor 64 is held nonconducting.

The relatively high potential at 57 is also applied to diode 80 which conducts, holding junction 79 at a potential higher than that of the emitter of PNP transistor 78, thus rendering transistor 78 nonconducting. With transistor 78 nonconducting the junction 77 is held at low potential. The potential at junction 77 is applied to the bases of transistor 61 and 63, transistor 61 being a PNP type transistor and transistor 63 being a NPN type transistor. When the potential at junction 77 is relatively low (negative) transistor 61 is conducting and transistor 63 is nonconducting. With transistor 61 conducting the plate *a* of capacitor 23 is electrically connected to a −10 volt supply which essentially charges plate *a* at −10 volts while plate *b* is held at ground. Thus a 10 volt differential is held across the plates *a* and *b*, with plate *a* lower than plate *b*.

When the multivibrator reverses itself transistor 46 is driven to nonconduction and transistor 45 becomes conductive. Under these conditions the potential at junction 53 drops to a relatively low (negative) potential. The output at junction 57 of the emitter-follower follows the characteristic of the potential at junction 53; thus the internal keying pulse (seen in FIG. 3, C) is a negative-going pulse.

The negative-going internal keying pulse is applied to line 81 to a driver, block 30 of FIG. 1 which provides the horizontal drive output which may be applied to a television camera, for example. In addition, the negative-going pulse is applied via lead 25 through resistor 65. Diode 67 becomes a blocking diode and the resulting limited negative pulse is applied via resistor 66 to the base of transistor 70 thereby driving transistor 70 to conduction. With transistor 70 conducting transistor 72 is driven to nonconduction. The potential at junction 71 increases positively and drives the field effect transistor to cutoff. The potential at junction 73 goes negative and drives the field effect transistor 64 into conduction. Thus the plate *b* of capacitor 23 is switched from ground to junction 15 via lead 26.

Prior to the negative-going internal keying pulse, diode 80 is conducting and junction 79 is held at a potential more positive than that of the emitter of transistor 78. The current in resistor 83 flows in diode 82 which holds the potential of the base of transistor 78 near that of the emitter. At the incidence of the negative-going pulse diode 80 becomes blocked so that the current to the −15 volt supply in resistor 84 causes junction 79 to drop in potential and the current in resistor 83 to reverse. Diode 82 becomes blocked and transistor 78 becomes conductive, raising the potentials at junction 77 and the bases of switching transistors 61 and 63. Condenser 76 provides negative feedback to the base of transistor 78 thus limting the rate of rise in the potential at junction 77. Thus the potential of junction 75 is caused to rise rapidly, but not instantaneously, from the initial −10 volt level, finally reaching zero or ground potential as transistor 63 becomes a closed switch. Plate *a* of reset capacitor 23 has thus risen through a 10 volt increment while plate *b* was connected via the switch transistor 64 and conductor 26 to junction 15.

The condenser discharge current during this use opposes and is much greater than the steady current in resistor 16, thus causing reversal of the current in the Miller feedback condenser 11. The output of the integrator is thus reset to a point near ground potential as shown by the drop during $t_d$ in curve B, FIG. 3. Continuation of this cycle of operation provides a sawtooth output at junction 18′, the frequency of the sawtooth output being dependent, in one form upon the RC time constant of the capacitor 23 and resistance of 16 when the input at 13 remains constant.

The frequency of the sawtooth wave may also be varied by varying the value of the input at 13 while maintaining the −10 volt supply via transistor 61 and the resistance of variable resistor 16 constant.

The lead 81 serves to apply the keying pulse to the Driver 30 circuit for providing a horizontal drive output at 31. The horizontal drive wave is represented at D in FIG. 3. The Drive circuit also provides a sync output at 32 which is applied to a Fast Recovery Monostable Multivibrator and Driver 33 which provides a horizontal unblanking output at 35 for a television monitor, for example. The horizontal unblanking output wave is represented at F in FIG. 3.

In addition to the unblanking output the Fast Recovery Monostable Multivibrator and Driver provides a horizontal blanking output at 34 which output may be applied to a television monitor and to a Monostable Multivibrator 36 which in turn controls a Driver 37 which provides the horizontal sync output at 38. The horizontal sync output is represented at E in FIG. 3.

The Drivers, the Fast Recovery Monostable Multivibrator and the Monostable Multivibrator are components well known to those skilled in the art.

It should be pointed out that in addition to a new approach to a horizontal sweep generator for providing the horizontal sweep output for use in a television system a keying pulse of the sweep generator has been utilized to synchronize and control other outputs required for operation of a television system. By television system it is meant to include a television camera, and monitor or monitors.

Referring in more detail to FIG. 3, wave A, the Field Enable Gate is the output of the block 10. This essentially controls the number of sweeps made by the horizontal sweep generator. During the time measured from $t_0$ to $t_1$ the horizontal sweep generator operates but from $t_1$ to $t_2$ the horizontal sweep generator is gated off.

The time represented by $t_f$ is the frequency time of the sawtooth wave. It will be seen that the peak or maximum amplitude point of the sawtooth wave corresponds in time to the leading edge of the internal keying pulse C, the leading edge of the horizontal drive pulse D and the leading edge of the horizontal sync pulse E.

The minimum amplitude point of the sawtooth wave, after having decreased from maximum amplitude corresponds in time to the trailing edge of the horizontal drive pulse, and the leading edge of the horizontal unblanking pulse.

As previously described the frequency of the sawtooth wave B may be varied from 15 kc. to at least 25 kc. by adjustment of the adjustable resistor 16 or by changing the amplitude of the input at 13.

Thus a new horizontal sweep generator has been described with the internal keying pulse of the generator used to control the generation of other useful outputs in a television system.

As is well known in the art several companion pulses are coordinated and synchronized with the horizontal sweep output in a television system. The book "Principles of Television Engineering" by Donald G. Fink, published by McGraw-Hill Book Company, Inc. in 1940 is here referred to as a source of information relating to the formation, deflection and synchronization of scanning beams.

The development of a horizontal drive output 31, a sync output 32, a horizontal unblanking output 35, a horizontal blanking output 34 and a horizontal sync output 38 all essentially keyed to the keying output 81 in a complete television system which may include the television camera and television receiver provides all the pulses required and such pulses all having a common synchronizing or keying signal.

The block 30 represents a driver which provides a signal such as shown at D in FIG. 3, the driver 30 being a component well known to those skilled in the art. The driver components in blocks 33 and 37 are also considered components well known to those skilled in the art. The monostable multivibrator 36 may distinguish from that repreesnted in block 20 since block 36 may represent a normal monostable multivibrator. The Fast Recovery Monostable Multivibrator is also believed to be a component well known to those skilled in the art.

Relative to FIG. 3 it will be seen that the number of sawtooth waves depends upon the frequency or, how many times $t_f$, may be divided into the time $t_0$ to $t_1$.

The leading edge of the internal keying pulse C is synchronized with the maximum amplitude of the sawtooth wave B.

The leading edge of the horizontal drive pulse at D is synchronized with the maximum amplitude or peak of the sawtooth wave B but is actually keyed by the internal keying pulse C. The time interval of the horizontal drive pulse corresponds with the time of the excursion of the sawtooth wave from maximum amplitude to minimum $t_d$.

The leading edge of the horizontal sync output pulse E is synchronized with the leading edge of the keying pulse.

The leading edge of the unblanking output pulse F is synchronized with the terminaiton of the time $t_d$.

The blanking output pulse has been omitted since it is a wave or pulse which is substantially the inverse of the unblanking pulse, F.

Thus a novel arrangement for a horizontal sweep generator has been described and, in addition, it has been shown how other pulses useful in a television system may be readily synchronized with the horizontal sweep output through use of a common internal keying pulse.

What is claimed is:

1. A horizontal sweep generator comprising,
   a Miller integrator having an output whose slope is proportional to an input potential applied thereto,
   a capacitor,
   switch means having first and second states of operation,
   said switch means in said first state of operation connecting one side of said capacitor to said input potential and the other side to a reference potential and in said second state of operation connecting said one side of said capacitor to said reference potential and the other side of said capacitor to the input of said Miller integrator whereby in said second state of operation said capacitor applies a potential to the input of said Miller integrator which opposes said input potential.

2. A horizontal sweep generator as set forth in claim 1 and further including,
   a monostable multivibrator connected to the output of said Miller integrator producing a pulse signal when the output of said Miller integrator reaches a selected level, and
   switch controlling means operated by said pulse signal to operate said switch means to said second state and to maintain said switch means in its first state in the absence of a pulse signal.

3. A horizontal sweep generator as set forth in claim 2 and further including,
   a variable resistor connected between said input potential and the input of said Miller integrator.

4. A horizontal sweep generator as set forth in claim 1 and further including,
   a variable resistor connected between said input potential and the input of said Miller integrator, and
   in which said reference potential is ground potential.

References Cited

UNITED STATES PATENTS

| | | | |
|---|---|---|---|
| 2,879,392 | 3/1959 | Mudie | 328—181 XR |
| 3,124,706 | 3/1964 | Alexander | 307—88.5 |
| 3,168,658 | 2/1965 | Marshall | 307—88.5 |
| 3,277,395 | 10/1966 | Grindle et al. | 307—88.5 XR |
| 3,323,353 | 6/1967 | Munger. | |
| 3,350,574 | 10/1967 | James | 307—88.5 |

ARTHUR GAUSS, *Primary Examiner.*

S. D. MILLER, *Assistant Examiner.*